United States Patent [19]
Hayami et al.

[11] 3,763,757
[45] Oct. 9, 1973

[54] ELECTRICALLY CONTROLLED SHUTTER FOR PHOTOGRAPHIC CAMERAS

[75] Inventors: Tadao Hayami; Atsutada Nakatani; Munetaka Shimizu, all of Tokyo, Japan

[73] Assignee: Kabushiki Kaisha Koparu, Tokyo, Japan

[22] Filed: Jan. 25, 1972

[21] Appl. No.: 220,638

[30] Foreign Application Priority Data
Feb. 5, 1971    Japan.................................. 46/4610

[52] U.S. Cl. ............................................. 95/53 EB
[51] Int. Cl. ............................................ G03b 9/08
[58] Field of Search ........... 95/10 CT, 10 C, 53 EA, 95/53 EB, 11.5 R

[56] References Cited
UNITED STATES PATENTS
3,650,193    3/1972    Munetaka Shimiyu....... 95/10 CT X
3,638,544    2/1972    Kiyoshi Kitai.................... 95/10 CT

*Primary Examiner*—Joseph F. Peters, Jr.
*Attorney*—Cushman, Darby & Cushman

[57] ABSTRACT

An electrically controlled shutter for photographic cameras comprising a magnet lever for operating a closing blade locking lever, a sectoral lever for delaying the rotary movement of said magnet lever, a bulb exposure lever engageable with said sectoral lever, and a changeover cam for switching the operative positions of said sectoral lever within the latter's scope of movement; and being operative so that, when the power source battery has become consumed and no longer usable or when a bulb exposure performance is required, the shutter function can then be controlled mechanically to obtain a proper exposure time.

3 Claims, 1 Drawing Figure

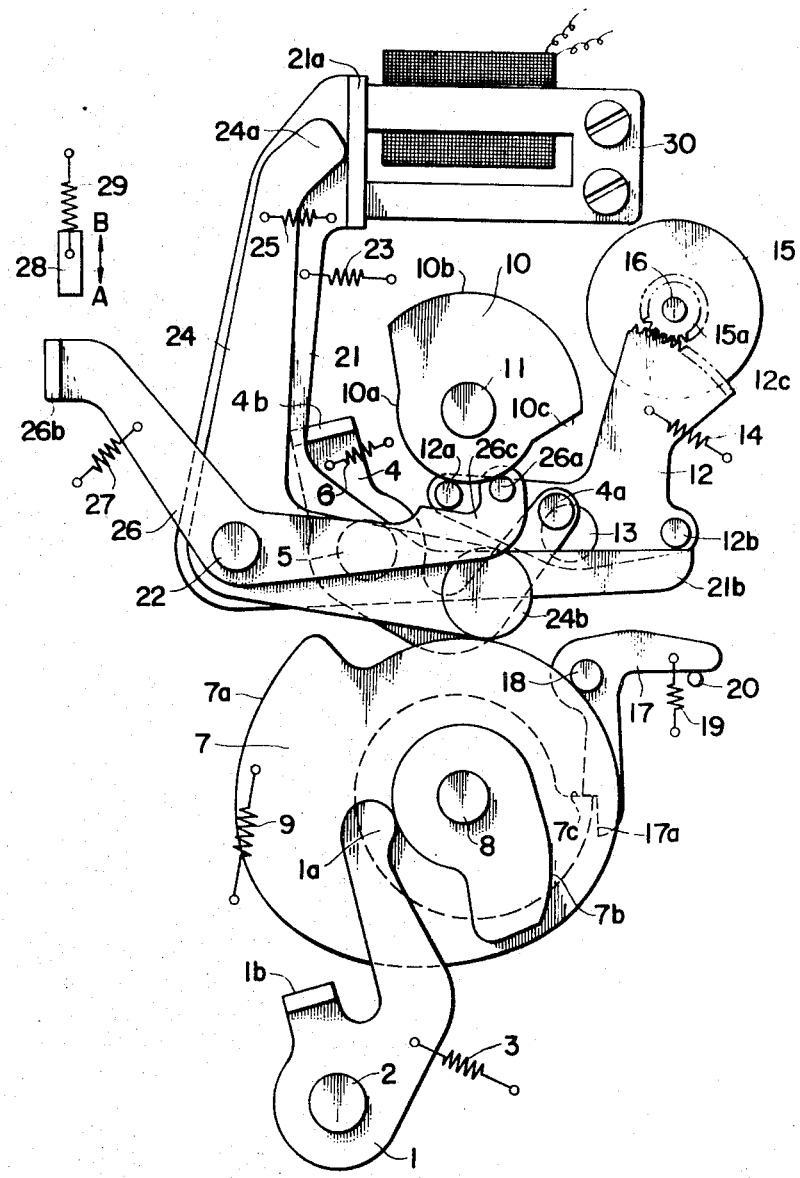

ELECTRICALLY CONTROLLED SHUTTER FOR PHOTOGRAPHIC CAMERAS

BACKGROUND OF THE INVENTION a. Field of the Invention

The present invention pertains to an electric shutter arranged so that the exposure time can be controlled by a C-R delay circuit. More particularly, the invention relates to an electric shutter arranged so that, when the power source battery has become dissipated to an unuseable extent, the exposure time can then be controlled also by mechanical means.

b. Description of the Prior Art

There are known various kinds of electric shutters comprising a C-R delay circuit formed with a photoconductive element and a capacitor, a transistor adapted to be controlled of its on-off actions by said C-R delay circuit, an electromagnet adapted to be controlled of its energization time by the on-off actions of said transistor, and shutter blades adapted to be controlled of their opening and closing movements by said electromagnet. However, such a known electric shutter is of the incidental that, in case the voltage of the power source battery has dropped to a level below the required value, the delay time which is determined by the C-R delay circuit, i.e., the exposure time which should correspond to the brightness of the object to be photographed fails to be correct and exact. In an extreme case, the shutter blades would be held open and would become unclosable. Accordingly, a conventional camera equipped with an electric shutter had the inconvenience that the camera itself became practically unuseable whenever the power source battery became dissipated and when its voltage dropped below the required value or in case the voltage of the battery temporarily dropped below the required level at a very cold place.

When a bulb exposure is performed by the use of such an electric shutter as described above, the exposure time control circuit is kept in its actuated state for a relatively long period. Hence, there arises another drawback that the power source battery is severely consumed, and this results in a shortened service life of the battery.

SUMMARY OF THE INVENTION

It is, therefore, an object of the present invention to provide an electric shutter arranged so that, when the power source battery has become dissipated to a practically unuseable extent due to its consumption, the shutter mechanism can be controlled to obtain a proper exposure time by mechanical means by operating only a single changeover member.

Another object of the present invention is to provide an electric shutter which permits bulb exposures to be performed mechanically by operating said single changeover member.

Other objects and attendant advantages of the present invention will become apparent by reading the following detailed statement of an embodiment when taken in conjunction with the accompanying drawing.

BRIEF DESCRIPTION OF THE DRAWING

The drawing is a plan view showing the mechanism of the essential parts of the electric shutter according to the present invention.

DESCRIPTION OF THE PREFERRED EMBODIMENT

In the drawing, the member indicated by the reference numeral 1 represents an opening blade locking lever pivotably mounted on a shaft 2 and urged to rotate clockwise by a spring 3 and provided with an arm 1a and a bent portion 1b for holding an opening blade not shown in its cocked state. Numeral 4 represents a closing blade locking lever pivotably mounted on a shaft 5 and urged to rotate clockwise by a spring 6 and provided with a pin 4a and a bent portion 4b for holding a closing blade not shown in its cocked state. Numeral 7 represents a starter member pivotably mounted on a shaft 8 and urged to rotate counter-clockwise by a spring 9 and provided with a cam portion 7a, a cam portion 7b for being contacted by the end portion of the arm 1a of the opening blade locking lever 1, and an engaging portion 7c. Numeral 10 represents a changeover cam pivotably mounted on a shaft 11 and provided with cam portions 10a and 10b and assigned to control the opening and closing actions of the power switch of a known exposure time control circuit not shown. Numeral 12 represents a sectoral lever pivotably mounted on a shaft 13 and urged to rotate clockwise by a spring 14 and provided with a pin 12a contacting said cam portion 10a, another pin 12b and a gear portion 12c. Numeral 15 represents a fly wheel pivotably mounted on a shaft 16 and provided with a gear 15a meshing with said gear portion 12. Numeral 17 represents a starter locking lever pivotably mounted on a shaft 18 and urged to rotate clockwise by a spring 19 and limited of its clockwise rotation by a stopper 20 and provided with an arm 17a engageable with the engaging portion 7c of the starter member 7. Numeral 21 represents a magnet lever pivotably mounted on a shaft 22 and urged to rotate clockwise by a spring 23 and provided at one end with a pole-contacting portion 21a adapted to be attracted to a magnet 30 and with an arm 21b at the other end. Numeral 24 represents a holding lever pivotably mounted on said shaft 22 and urged to rotate clockwise relative to the magnet lever 21 by a spring 25 and provided with an arm 24a contacting said pole-contacting portion 21a and a pin 24b contacting said cam portion 7a. Numeral 26 represents a bulb exposure lever pivotably mounted on the shaft 22 and urged to rotate counter-clockwise by a spring 27 and provided with a pin 26a contacting the changeover cam 10, a bent portion 26b and an arm 26c. Numeral 28 represents a release lever movable in the directions A and B and normally pulled in the direction B by a spring 29 and adapted to be pulled downwardly in the direction A against the force of the spring 29 interlockingly with the release operation of the camera, so as to be actuated to cause, via an interlocking lever not shown, the starter locking lever 17 to rotate counterclockwise. Numeral 30 represents an electromagnet controlled of its energization time by the aforesaid known exposure time control circuit.

Description will hereunder be directed to the actions of the respective parts in the arrangement described above.

The drawing shows the state of the electric shutter in which it is set to be suitable for a bulb exposure performance and also in which the shutter is cocked. The respective changeover operations in the two instances for controlling the exposure time, one by mechanical means and the other by electric means, both from the illustrated state of the shutter are effected by manually operating the changeover cam 10. More specifically, the cam 10 is rotated clockwise by the manual operation from the illustrated state to set only the pin 26a so as to contact the cam portion 10b. Whereby, the shutter is set so that the exposure time is controlled by mechanical means. On the other hand, by bringing the pin 26a as well as the pin 12a into contact with the cam portion 10b, the shutter is set so that the exposure time is controlled electrically.

Description will next be directed first to an instance wherein only the pin 26a is brought into contact with the cam portion 10b, or in other words an instance wherein the exposure time is controlled by mechanical means. In this instance, the power switch of the exposure time control circuit not shown is held in its open state by the changeover cam 10. In this state, let us assume that the release lever 28 is depressed. Whereupon, the starter locking lever 17 is rotated counter-clockwise to be relieved of its engagement with the engaging portion 7c, and thereby the starter member 7 is rotated counter-clockwise. As a direct consequence, the opening blade locking lever 1 is caused to rotate counter-clockwise by the cam portion 7b so that the shutter is opened. This action is followed by the counter-clockwise rotation of the holding lever 24 caused by the cam 7a. This lever 24 imparts the magnet lever 21 a counter-clockwise movement by the spring 25. As a result, the arm 21b of this magnet lever 21 pushes the pin 12b of the sectoral lever 12. Accordingly, the arm 21b of the magnet lever 21 is rotated counter-clockwise while being reduced in its speed by both the sectoral lever 12 and the inertial resistance exerted by the fly wheel 15 meshing with this lever 12. As a consequence, the arm 21b of the magnet lever 21 pushes the pin 4a to rotate the closing blade locking lever 4 counter-clockwise, and with this the exposure completes. In this instance, the exposure time can be adjusted by the amount of rotation of the sectoral lever 12, i.e., by the position of the pin 12a at which it contacts a inclined face 10c of the changeover cam 10.

The cocking operation of the shutter is performed by manipulating the winding mechanism not shown of the camera, or more specifically, this manipulation is accompanied by a clockwise rotation of the starter member 7 on the one hand, which brings its engaging portion 7c into engagement with the starter locking lever 17, and also simultaneously accompanied on the other hand by the cocking of the shutter opening and closing action driving mechanism not shown to cause a part of this driving mechanism to be locked by the opening blade locking lever 1 and also by the closing blade locking lever 4, respectively.

Next, description will be made on an instance wherein both of the pin 26a and the pin 12a are brought into contact with the cam portion 10b, or in other words an instance wherein the exposure time is controlled by electric means. In the manner as stated previously, the cam portion 7a of the starter member 7 rotates the holding lever 24 counter-clockwise. Whereupon, due to the changeover action of the changeover cam 10, the power switch which has been rendered to the state of being able to close is closed, so that the exposure time control circuit not shown is rendered operative. The electromagnet 30 which is energized at the same time therewith attracts the magnet lever 21 and holds it thereto. At the end of the lapse of a predetermined exposure time which is the matter of a second or so, the electromagnet 30 releases the magnet lever 21 to complete the exposure as explained previously. In this mode of operation, the sectoral lever 12 is located at a position in which it has been rotated counter-clockwise by the cam portion 10b. Therefore, this sectoral lever 12 has nothing to do with the counter-clockwise movement of the magnet lever 21.

Next, description will be made on an instance wherein both of the pin 26a and the pin 12a are brought into contact with the cam portion 10a, or in other words an instance wherein the shutter is set to the bulb exposure state.

In the illustrated state of the shutter, let us assume that the release lever 28 is depressed. Whereupon, after this release lever 28 has entered the region of action of the bent portion 26b of the bulb exposure lever 26, the starter locking lever 17 is actuated so that the starter member 7 rotates counter-clockwise, eventually urging the magnet lever 21 to rotate counter-clockwise by the action of the spring 25. At this moment, however, the pin 12a is locked by the arm 26c of the bulb exposure lever 26. Accordingly, the magnet lever 21 is prevented from making a counter-clockwise rotation via the sectoral lever 12. As a result, the closing blade locking lever 4 remains inoperative. Thus, by relieving the release lever 28 of its depression to have this lever 28 resume its initial position by the action of the spring 29, the bulb exposure lever 26 is caused to rotate clockwise by the action of the spring 27 to relieve the pin 12a of its locking state. As a consequence, the magnet lever 21 rotates counter-clockwise, causing the closing blade locking lever 4 to rotate counter-clockwise to close the shutter. Accordingly, the bulb exposure is effected mechanically without the use of the exposure time control circuit.

We claim:

1. An electric shutter for photographic camera comprising:
   an electromagnet controlled of its energization time,
   a magnet lever positioned adjacent to said electromagnet and adapted to be attracted to said electromagnet and held thereto continuously so long as said electromagnet is being energized,
   a holding lever positioned to be engageable with said magnet lever and adapted to be rotated by said magnet lever upon de-energization of said electromagnet to start shutter closing movement,
   a sectoral lever positioned to be engageable with said magnet lever and capable of delaying the rotary movement of said magnet lever, and
   a changeover cam positioned to be engageable with said sectoral lever and capable of moving said sectoral lever into and out of engagement with said magnet lever.

2. An electric shutter according to claim 1, in which said changeover cam has a cam face for altering interlockingly the position of engagement of said magnet lever with said sectoral lever as said sectoral lever is moved into engagement with said magnet lever.

3. An electric shutter according to claim 1, in which said electric shutter further comprises a bulb exposure lever positioned to be engageable with said changeover cam for moving said sectoral lever into engagement with said magnet lever when said changeover cam has been set to the bulb exposure position and for enabling said bulb exposure lever to lock said sectoral lever during the shutter release operation.

* * * * *